United States Patent [19]

Yamada

[11] Patent Number: 5,550,584
[45] Date of Patent: Aug. 27, 1996

[54] BUS-LINE NETWORK COMMUNICATION SYSTEM

[75] Inventor: Hiroshi Yamada, Kobe, Japan

[73] Assignee: Canopus Co., Ltd., Hyogo, Japan

[21] Appl. No.: 385,463

[22] Filed: Feb. 8, 1995

Related U.S. Application Data

[63] Continuation-in-part of Ser. No. 8,771, Jan. 25, 1993.

[30] Foreign Application Priority Data

Feb. 19, 1992 [JP] Japan .................................. 4-32263

[51] Int. Cl.⁶ .................................................. H04N 7/18
[52] U.S. Cl. ............................ 348/153; 348/10; 348/159
[58] Field of Search ................................ 348/153, 159, 348/6, 8, 10; H04N 7/18

[56] References Cited

U.S. PATENT DOCUMENTS

| | | | |
|---|---|---|---|
| 4,959,713 | 9/1990 | Morotomi | 348/156 |
| 4,977,449 | 12/1990 | Morgan | 348/159 |
| 5,237,408 | 8/1993 | Blum | 348/154 |
| 5,270,811 | 12/1993 | Ishibashi | 348/143 |
| 5,335,014 | 8/1994 | Elberbaum | 348/159 |

FOREIGN PATENT DOCUMENTS

| | | | |
|---|---|---|---|
| 110165 | 11/1986 | Japan | H04N 7/10 |
| 180183 | 2/1990 | Japan | H04M 9/00 |

*Primary Examiner*—Howard W. Britton
*Attorney, Agent, or Firm*—Darby & Darby, P.C.

[57] ABSTRACT

Bus-line network communication system in which changing of adding number or location of monitoring camera can be carried out with easy: A central monitoring device 50 and monitoring cameras C31 to C40 are connected with a communication bus-line 40. The central monitoring device send a request command to the bus-line 40. The request command is received by the selected camera through the bus-line 40. The selected camera which is received the request command, send image data to the-bus line 40. The central monitoring device receives the image data and displays image.

8 Claims, 8 Drawing Sheets

FIG. 4

| SWITCH No. | CAMERA No. |
|---|---|
| $52_1$ | C 3 1 |
| $52_2$ | C 3 2 |
| $52_3$ | C 3 3 |
| ⋮ | ⋮ |
| $52_9$ | C 3 9 |
| $52_{10}$ | C 4 0 |
| $52_{11}$ | — |
| ⋮ | ⋮ |
| $52_n$ | — | ial control device 20. Also, it is difficult
BUS-LINE NETWORK COMMUNICATION SYSTEM This application is a continuation-in-part of application Ser. No. 08/008,771 filed Jan. 25, 1993.

BACKGROUND OF THE INVENTION

1. Field of the Invention

The present invention relates to an image communication system using a network bus-line.

2. Description of the Prior Art

In general, factories or the like have a system for monitoring images from a plurality of predetermined places inside or outside the factories. The monitoring system has many cameras in the predetermined places to be monitored. Image data obtained by the monitoring cameras are collected in a central control device which has display monitors to display the image data in order to indicate whether abnormal or unusual events have occurred. Each camera is connected to the central control device through an individual line. The images from the predetermined places to be monitored are displayed on a display monitor selected by a selection switch.

FIG. 1 shows a block diagram of a prior art monitoring system including several monitoring cameras. This monitoring system comprises a central control device 20 and monitoring cameras C1, C2, C3, C4 and C5. The cameras C1, C2, C3, C4 and C5 are connected to the central control device 20 through their respective cable L1, L2, L3, L4 and L5. The central control device 20 has three monitoring televisions 25a, 25b and 25c, and selection switches 22a to 22e for the cameras C1 to C5. Image data obtained by the cameras C1 to C5 are sent to the central control device 20 through the cable lines L1 to L5.

In the central control device 20, the image data are selectively displayed on the monitoring televisions 25a, 25b and 25c. The following operation is carried out to display an image from the camera C4 and an image from the camera C5, when images from cameras C1, C2 and C3 are displayed on the monitoring televisions 25a, 25b and 25c, respectively.

At first, the selection switches 22a, 22b and 22c which correspond to the cameras C1, C2 and C3, are turned off. As a result of this operation, televisions 25a, 25b and 25c are disconnected from cameras C1, C2 and C3. Therefore, televisions 25a, 25b and 25c do not display any image. Next, the selection switches 22d and 22e which correspond to cameras C4 and C5, are turned on. As a result of this operation, television 25a is connected to camera C4 through cable L4, and television 25b is connected to camera C5 through cable L5. Therefore, television 25a displays the image from camera C4 and television 25b displays the image from camera C5. An image from any desired camera can be displayed by selecting the corresponding selection switch 22a to 22e.

However, the above mentioned monitoring system has the following problems.

To select an image from a camera, a corresponding switch is required for each camera. Therefore, it is difficult to increase the number of cameras beyond the number of selection switches.

As shown in FIG. 7, each camera C1, C2, C3 and C4 is connected to the central control device 20 through a respective cable L1, L2, L3 or L4. Accordingly, cable wiring becomes complex because a large number of cables are connected to the central control device 20. Also, it is difficult to change the location of camera C1, C2, C3 or C4 or to add an additional camera. For example, when a camera C5 is added in FIG. 7, cable L5 must be added between the camera C5 and the central control device 20. This problem is exacerbated when a large number of cameras are provided or cameras are located distant from the central control device 20.

SUMMARY OF THE INVENTION

It is an object of the present invention to provide a bus-line network communication system in which the change in location or addition of a monitoring camera can be easily carried out.

An image obtaining terminal for connection to a network bus-line in accordance with the present invention comprises:

a) video converting means for converting an image into a video signal, b) analog to digital convening means for converting the video signal into digital image data, c) memory means for storing the image data, d) judging means for determining whether or not a request command on the network bus-line is addressed to the particular image obtaining terminal, and e) communication control means for sending the image data stored in the memory means to the network bus-line when the judging means determines that the request command is addressed to the particular image obtaining terminal, said communication control means adding art identifier to the image data before it is sent that indicates that the image data is being sent from the particular image obtaining terminal.

A central monitoring device for connection to a network bus-line in accordance with the present invention comprises:

a) terminal selection means for selecting a particular image obtaining terminal from among all of the image obtaining terminals which are connected to the network bus-line, b) sending means for sending a request command that requests a particular image obtaining terminal to send back image data to the network bus-line, said sending means adding art identifier to the request command before it is sent that indicates that the request command is addressed to the particular image obtaining terminal, c) digital to analog converting means for converting the image data sent by the particular image obtaining terminal on the network bus-line into an analog video, signal and d) image reproduction means for reproducing a an image from the video signal.

A method for implementing a bus-line network communication system between a central monitoring device and a plurality of image obtaining terminals connected to a single network bus-line, in accordance with the present invention comprises the following steps:

sending a request command from the central monitoring device to a particular image obtaining terminal through the network bus-line, judging in each image obtaining terminal whether or not the request command flowing on the network bus-line is addressed to the particular image obtaining terminal and sending image data to the network bus-line from the particular image obtaining device which is addressed by the request command, said particular image obtaining terminal adding an identifier that indicates that the image data is being sent from the particular image obtaining terminal, and reproducing, in said central monitoring device, an image corresponding to the image data sent on the network bus-line.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 4 is a table of switch settings and camera selection.

DETAILED DESCRIPTION OF THE PREFERRED EMBODIMENTS

A bus line network communication system according to one embodiment of the present invention will now be described with reference to the accompanying figures.

Although the present invention is described by way of example as a monitoring system for factories, it should be understood that the present invention can be applied to other systems for communicating images or recorded images.

Figure 1:
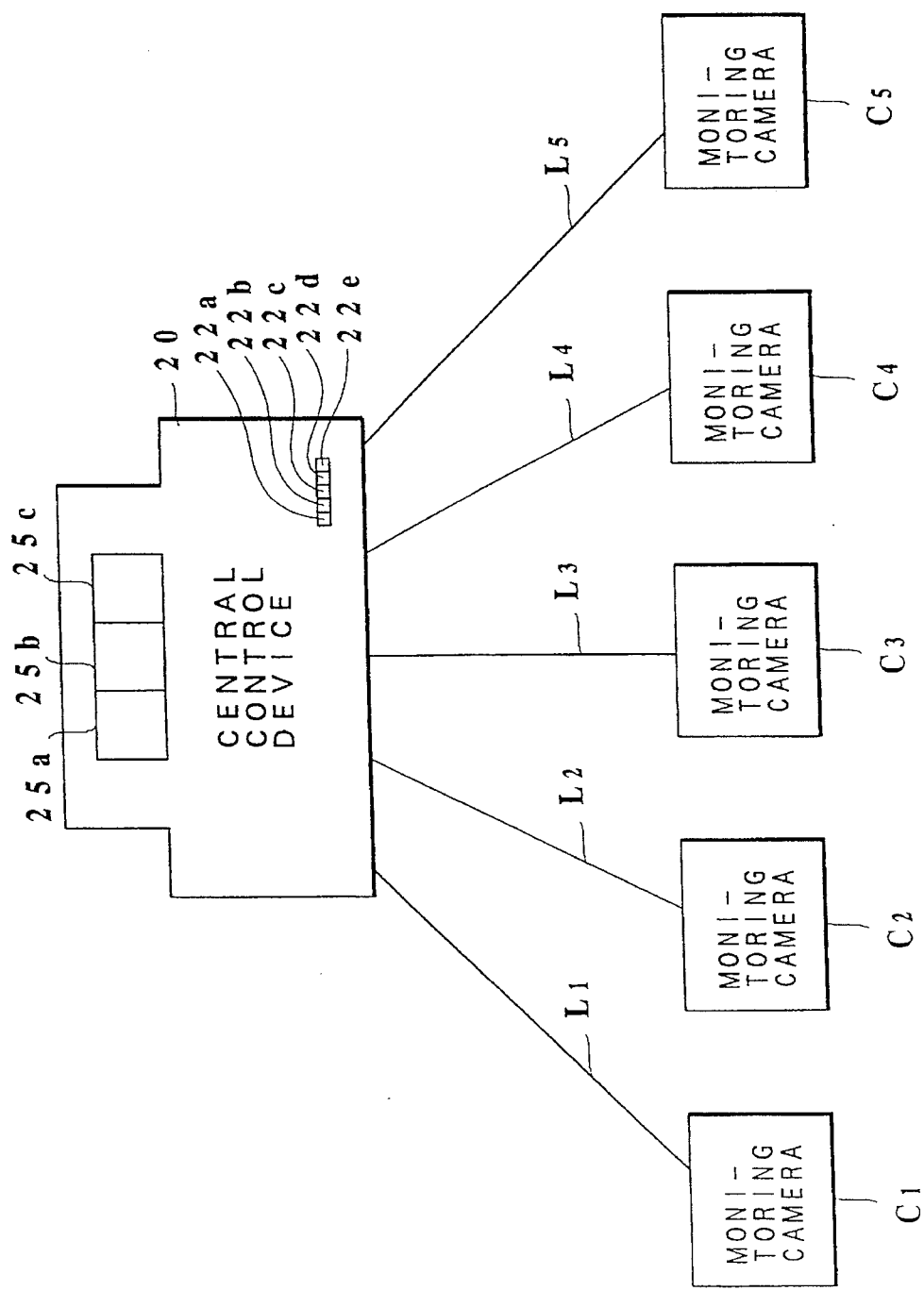
FIG. 1 is a block diagram of a prior art communication network system including monitoring cameras.
Figure 2:
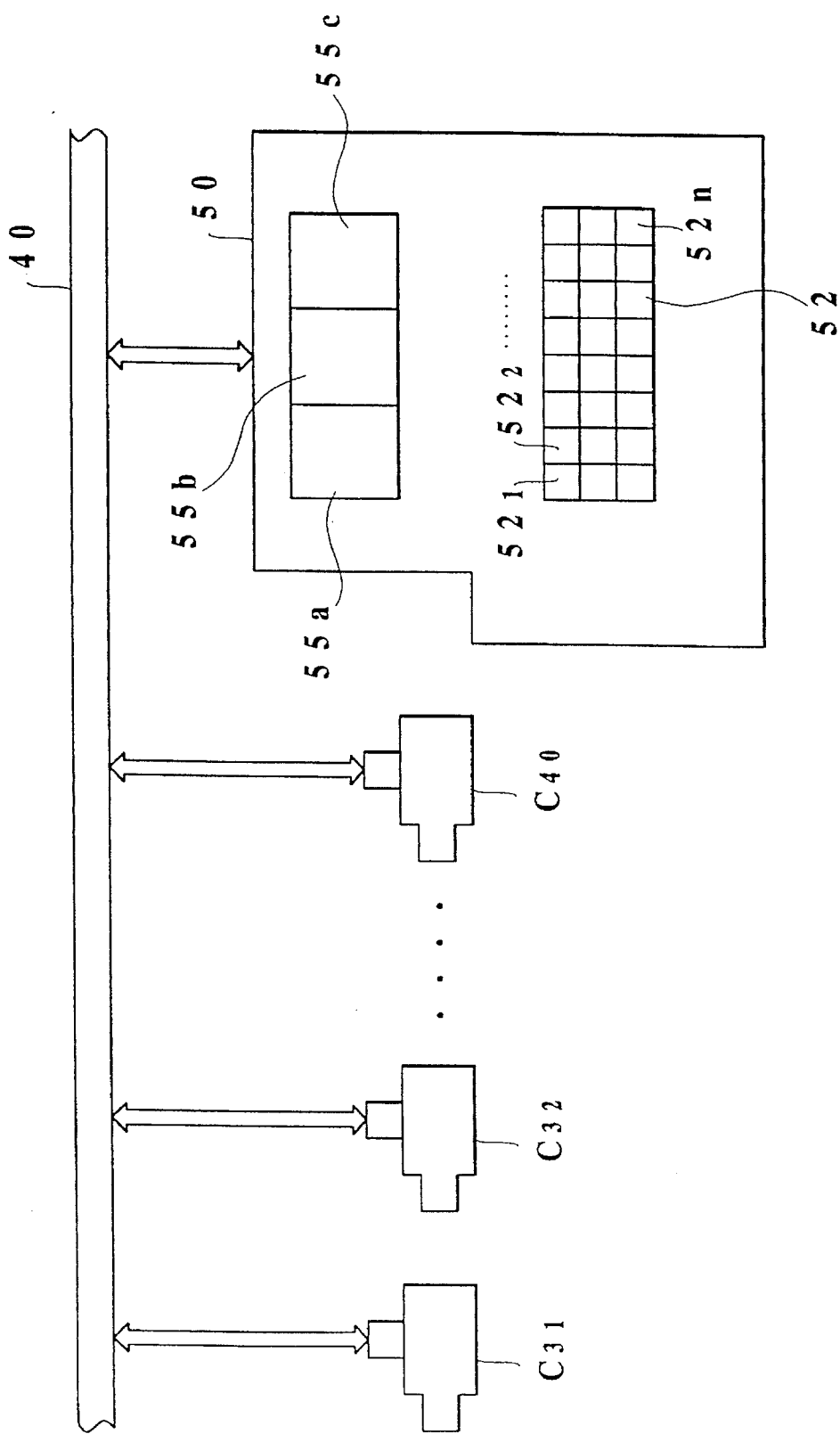
FIG. 2 is a block diagram of a bus-line network communication system according to one embodiment of the present invention.

Referring now to FIG. 2 therein is shown a block diagram of a bus-line network communication system according to one embodiment of the present invention. Ten monitoring cameras (video cameras) C31 to C40 are used as image obtaining terminals and are connected to a communication bus-line 40, such as a network bus-line. Twisted Pair wire (unshielded or shielded), coaxial cable, optical fiber or the like can be used to implement communication bus-line 40. Ethernet, Token Ring network or the like can be used to implement the network system.

A central control device 50 is connected to the communication bus-line 40. The ten monitoring cameras are connected to the central control device 50 through the communication bus-line 40. The central control device 50 comprises three monitoring televisions (Cathode Ray Tube, Liquid Crystal Display or the like) 55a, 55b and 55c which function as image reproduction means as well as operation switches $52_1$, to $52_n$ which function as terminal selection means.

Figure 3A:
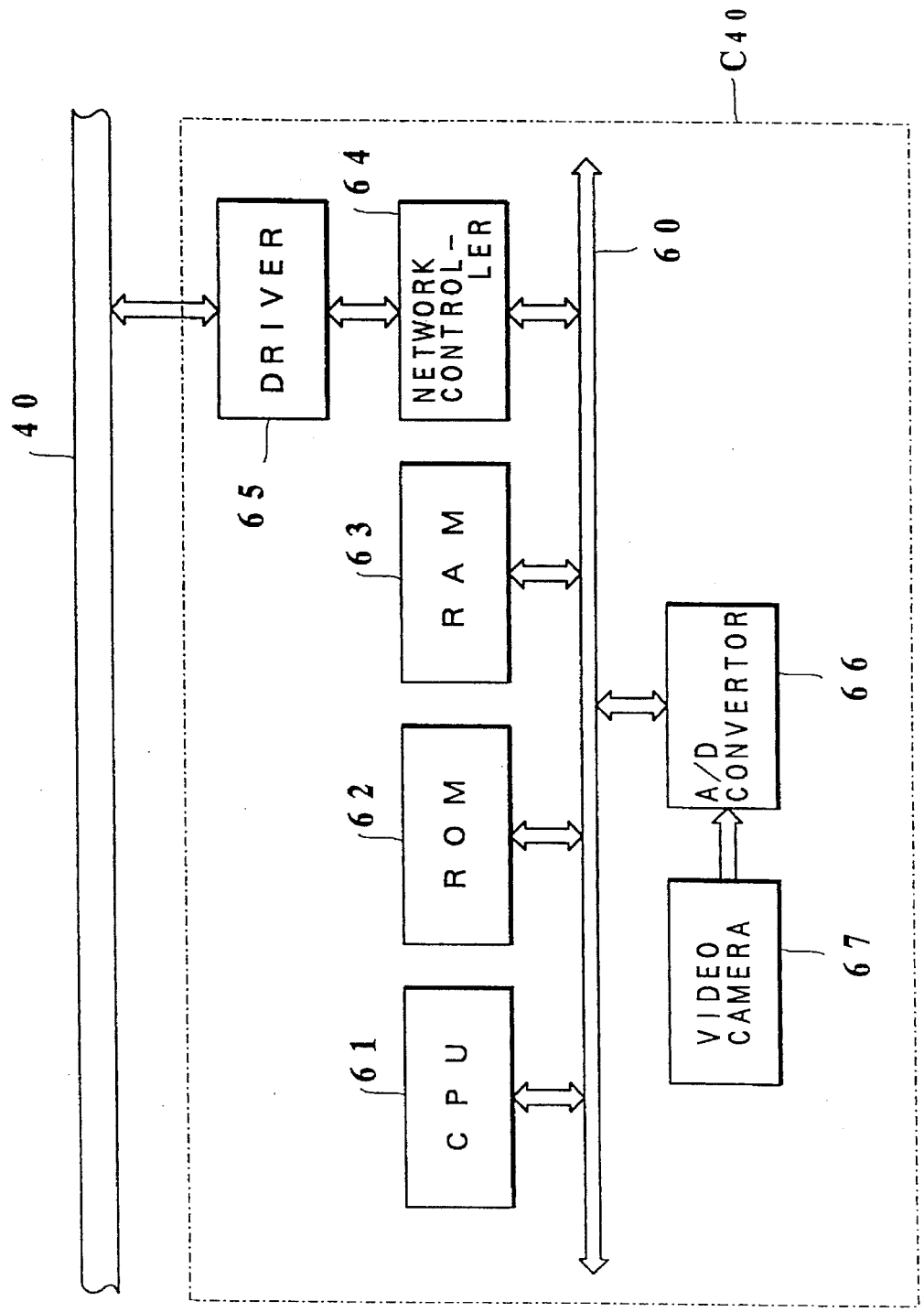
FIG. 3A is a block diagram of a monitoring camera.

FIG. 3A is a block diagram showing the construction of the monitoring camera C40. Other monitoring cameras C31 to C39 have a similar construction as that of camera C40. A video camera part 67 functions as video converting means and includes an optical system and art optical-electrical exchange device such as a charge coupled device or photo multiplier which takes an image of art object to be monitored and outputs an analog video signal. The analog video signal is passed to A/D convertor 66 which converts the analog signal into a digital format.

CPU 61, ROM 62 and RAM 63 which functions as a memory means for storing the image data are connected to internal bus-line 60. Although in this embodiment RAM 63 is used as the memory means for storing the image data, other memory devices such as a fixed disk may be used, depending on the particular memory capacity or processing speed.

A network controller 64 which performs communication control is connected to the internal bus-line 60. The network controller 64 is also connected to the communication bus-line 40 through a driver 65. The driver 65 outputs analog signals in accordance with received digital signals from the network controller 64 and converts the signals from the communication bus-line 40 for use by the network controller 64.

Part No. DP83901 (National Semiconductor Co. Ltd) may be used for the network controller 64. Part No. DP8392 (National Semiconductor Co. Ltd) may be used for the driver 65.

Figure 3B:
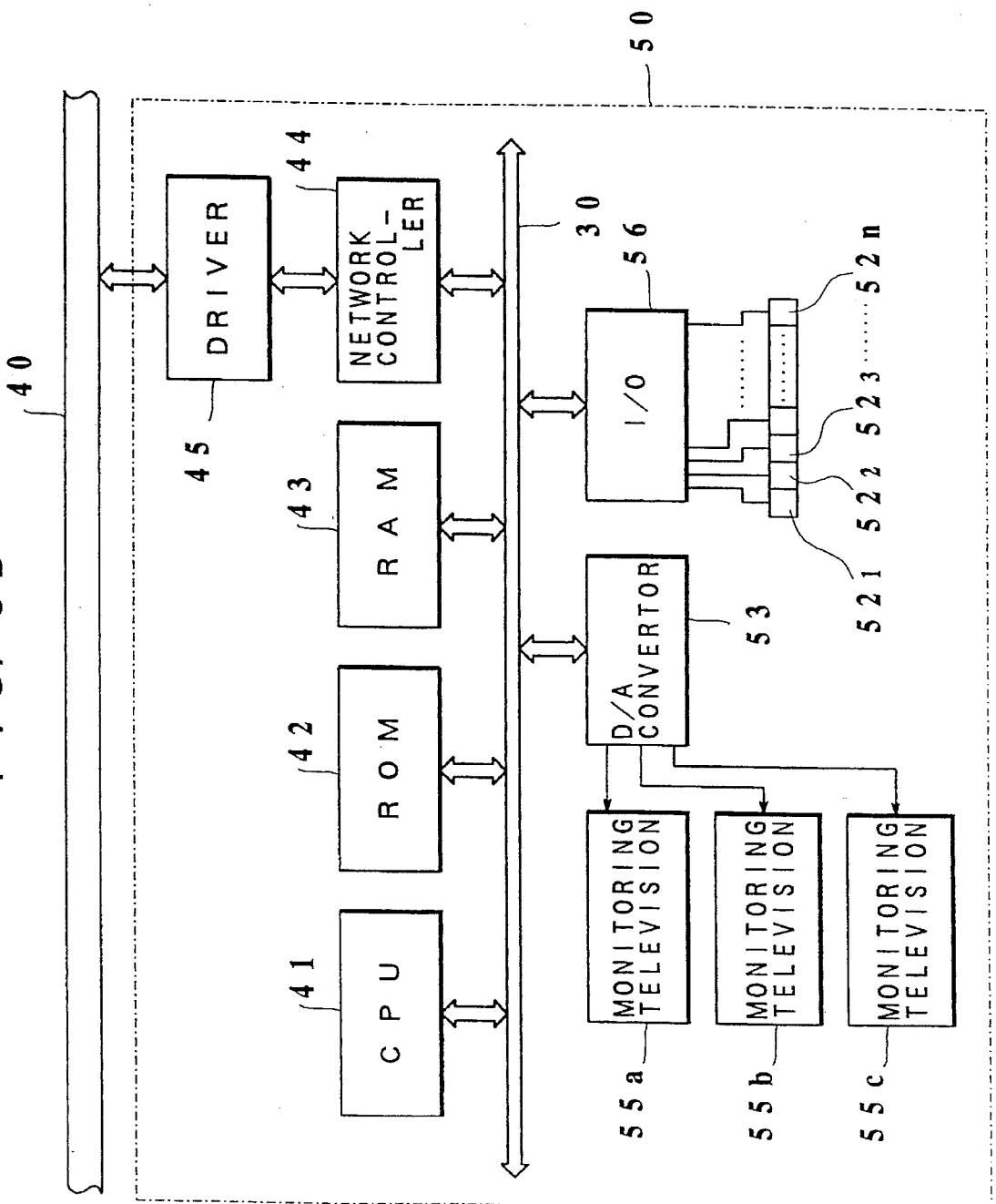
FIG. 3B is a block diagram of a central monitoring device.

Referring now to FIG. 3B therein is shown a block diagram of the central control device 50. Monitoring televisions 55a, 55b and 55c which function as image reproduction means are connected to an internal bus-line 30 by way of a D/A convertor 53. Alternatively, a liquid crystal display or the like may be used for the image reproduction means. CPU 41, ROM 42 and RAM 43 are also connected to the internal bus-line 30. Operation switches $52_1$ to $52_n$ which function as terminal selection means as well as a network controller 44 are connected to the internal bus-line 30. The network controller 44 is also connected to the communication bus-line 40 through a driver 45. The operation switches may, for example, be turned on by pushing on the top of the particular switch and are connected to the internal bus-line 30.

Part No. DP83901 (National Semiconductor Co. Ltd) may be used for the network controller 44. Part No. DP8392 (National Semiconductor Co. Ltd) may be used for the driver 45.

Referring to FIGS. 2, 3A and 3B, the operation of the system will now be described. The monitoring cameras C31 to C40 which are provided in each location to be monitored all operate in a similar manner.

The video camera part 67 takes an image of the location to be monitored and generates a corresponding analog video signal (see FIG. 3A). This analog signal is convened into digital image data $V_{40}$ (digital data) by A/D converter 66 and passed to CPU 61 on internal bus-line 60. CPU 61 stores the image data $V_{40}$ into RAM 63 in accordance with a program stored on ROM 62.

The remaining monitoring cameras C31 to C39 carry out a similar operation to store image data $V_{31}$ to $V_{39}$.

The operator selects the cameras which are located in the particular locations to be monitored, from among cameras C31 to C40 by selectively turning on the corresponding selection switches $52_1$ to $52_n$ of the central monitoring device 50. In this particular embodiment, up to three cameras can be selected, because three monitoring televisions 55a, 55b and 55c are provided (see FIG. 3B). For example, monitoring cameras C31, C32 and C40 may be selected by turning on the corresponding selection switches $52_1$, $52_2$ and $52_{10}$. The number of selection switches $52_1$ to $52_n$ is equal to or greater than the number of monitoring cameras C31 to C40. Alternatively, it may be desirable to provide a number of selection switches which is greater than the number of monitoring cameras, as will be described below. CPU 41 detects the ON state of switches $52_1$, $52_2$ and $52_{10}$ and outputs request commands for monitoring cameras C31, C32 and C40 corresponding to switches $52_1$, $52_2$ and $52_{10}$. A relation table between the operation switches $52_1$ to $52_n$ and the monitoring cameras C31 to C40 is stored in RAM 43. Therefore, CPU 41 can select the monitoring cameras in accordance with the table stored in RAM 43. When the cameras corresponding to the selected operation switches are determined, CPU 41 directs the network controller 44 to output the appropriate request commands to the selected cameras. The network controller 44 sends the request commands to the communication bus-line 40 through the driver 45.

The request command includes an identifier which indicates that the request should be sent from the central monitoring device 50 to a specified monitoring camera. For example, the request command $D_{31}$ includes an identifier that the request should be sent to the monitoring camera C31, the request command $D_{32}$ includes an identifier that the request should be sent to the monitoring camera C32 and the request command $D_{40}$ includes an identifier that the request should be sent to the monitoring camera C40.

These request commands $D_{31}$, $D_{32}$ and $D_{40}$ are transmitted on the communication bus-line 40 in a packet data format. The packet data format prevents cross talk when a number of request commands to the cameras C31 to C40 are transmitted on a single (a set of) bus-line 40.

The network controller 44 of central monitoring device 50 monitors the signals on the communication bus-line 40 in order to locate an empty signal period, and sends the request commands $D_{31}$, $D_{32}$ and $D_{40}$ on the communication bus-line 40 during the empty signal period. The order in which the request commands $D_{31}$, $D_{32}$, and $D_{40}$ are sent is determined by the network controller 44.

The network controller 64 of the monitoring cameras C31 to C40 receives the signals on the communication bus-line 40 and judges whether or not the signal is a request command to the particular monitoring camera. When the request command is determined not to be for the particular monitoring camera, the network controller 64 ignores the request command. When the request command is determined to be for the particular camera, the network controller 64 notifies the CPU 61 that a request command for the particular camera has been detected. Therefore, monitoring camera 31 operates in accordance with request command $D_{31}$, monitoring camera 32 operates in accordance with request command $D_{32}$ and monitoring camera 40 operates in accordance with request command $D_{40}$.

Figure 5:
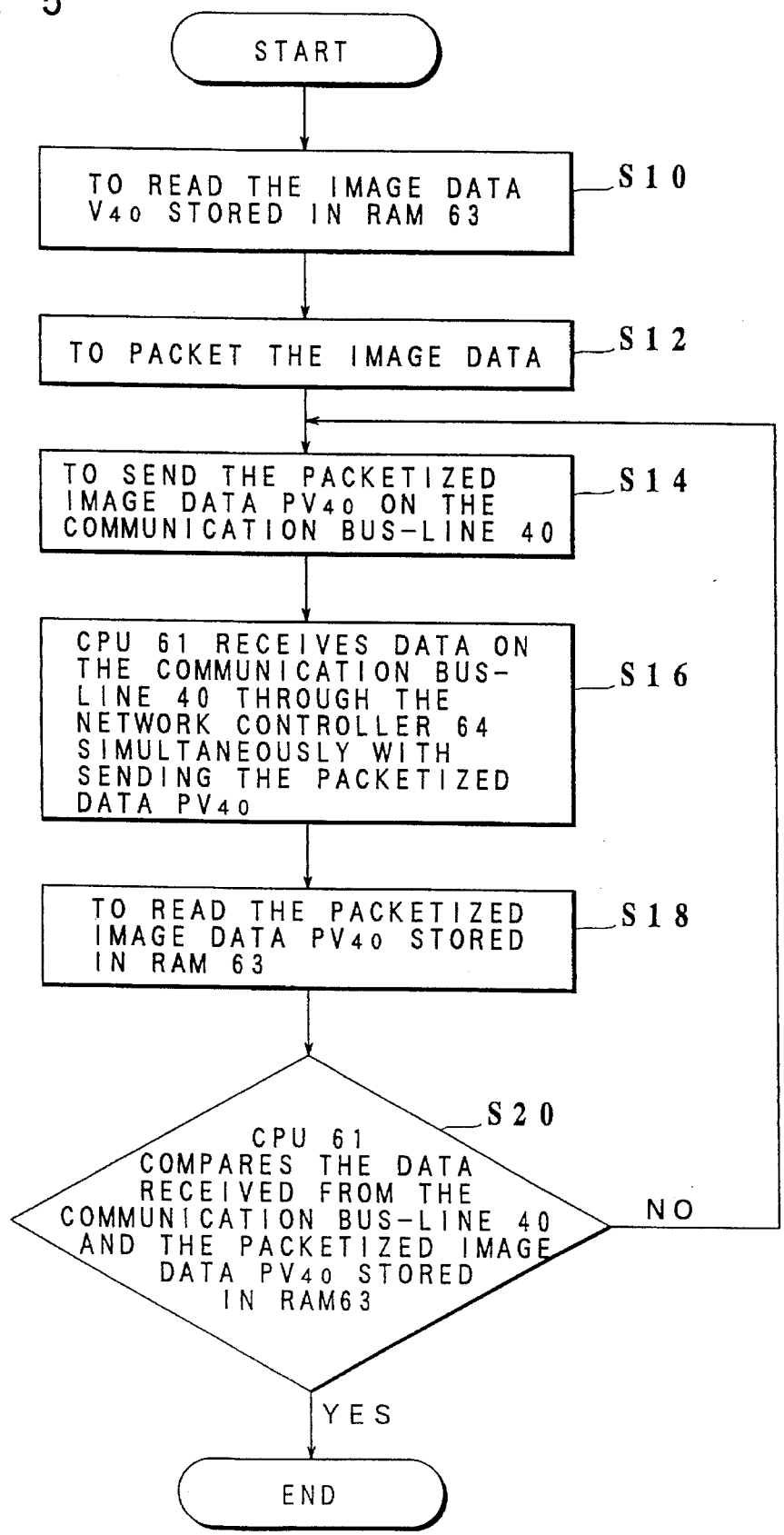
FIG. 5 is a flow-chart showing how image data is sent from the monitoring camera to the central monitoring device.

The operation of the selected cameras in transmitting image data to the central monitoring device 50 will now be described. The image data is transmitted from the selected cameras during an empty signal period on communication bus-line 40. FIG. 5 is a flow chart of a program stored in ROM 62 of the monitoring camera.

In the monitoring camera C40, CPU 61 which recognizes that a request command is being sent to the particular camera, reads the image data $V_{40}$ stored in RAM 63 (step $S_{10}$). Next, at step $S_{12}$ CPU 61 packetizes the image data $V_{40}$. In this packetization, an identifier of the particular image obtaining device or camera is added to the image data. For example, when the data transmission is from monitoring camera C40, it is clear through the identifier that the data should be transmitted from the monitoring camera C40 to the central monitoring device 50.

Next, CPU 61 directs the network controller 64 to send the packetized image data $PV_{40}$ on the communication bus-line 40 (step $S_{14}$). Cross talk affecting the data is caused by the simultaneous transmission of other data on the communication bus-line 40.

CPU 61 also receives data on the communication bus-line 40 through the network controller 64 simultaneous with the transmission of packetized data $PV_{40}$ (step $S_{16}$). CPU 61 reads the packetized data $PV_{40}$ stored in RAM 63 (step $S_{18}$). CPU 61 compares the data received from the communication bus-line 40 with the packetized image data $PV_{40}$ stored in RAM 63 (step $S_{20}$).

When both the stored data and the received data are identical, the transmission of the image data has been successfully completed, because no cross talk has been introduced.

When both the stored data and the received data are not identical, CPU 61 retransmits the packetized image data $PV_{40}$ on the communication bus-line 40. In other words, CPU 61 returns to step $S_{14}$. Again, CPU 61 compares the data received from the communication bus-line 40 with the packetized image data $PV_{40}$ stored in RAM 63 (step $S_{20}$). CPU 61 repeats this operation until both the stored data and the received data are identical.

As described above, the packetized image data $PV_{40}$ may be sent from the selected monitoring camera C40 to the communication bus-line 40 without the introduction of any cross talk.

The other selected monitoring cameras C31 and C32 also send packetized image data $PV_{31}$ and $PV_{32}$ to the communication bus-line 40 in much the same manner.

Similarly, the network controller 44 of central monitoring device 50 monitors the data and identifiers on the communication bus-line 40 in order to determine if the data is intended for the central monitoring device. In this way, the packetized image data PV31, PV32 and PV40 which are sent from the monitoring cameras C31, C32 and C40 on the communication bus-line 40, are recognized by the network controller 44 of central monitoring device 50 as data intended for the central monitoring device 50.

When the network controller 44 recognizes that the data is intended for the central monitoring device 5.0., the network controller 44 converts the packetized image data $PV_{31}$, $PV_{32}$ and $PV_{40}$ to the original image data $V_{31}$, $V_{32}$ and $V_{40}$. CPU 41 directs D/A convertor 53 to convert the digital image data $V_{31}$, $V_{32}$ and $V_{40}$ into analog video signals $A_{31}$, $A_{32}$ and $A_{40}$. The analog video signals $A_{31}$, $A_{32}$ and $A_{40}$ are provided to corresponding monitoring televisions 55a, 55b and 55c, respectively. The image of the location to be monitored can thus be displayed on one of the monitoring televisions 55a, 55b or 55c.

It is desirable to display the identification number (or location) of the monitoring camera which is transmitting the packetized image data, on the monitoring televisions 55a, 55b and 55c along with the image.

The received packetized image data $PV_{31}$, $PV_{32}$ and $PV_{40}$ may be temporarily stored in RAM 43.

The system repeats the above mentioned operations, i.e., the operation of detecting the ON state of the operation switches by CPU 41 in the central monitoring device 50, the operation of sending request commands to a particular camera, the operation of transmitting the packetized image data from the camera and the operation of displaying the image data on a monitoring television in the central monitoring device 50. Because the packetized image data is transmitted at high speed and is time multiplexed on the communication bus-line 40, the image of the location to be monitored can be displayed on the monitoring televisions 55a, 55b and 55c without interruption.

Therefore, the images from selected monitoring cameras (desired locations to be monitored) can be displayed on the monitoring televisions 55a, 55b and 55c by selecting the appropriate operation switches $52_1$ to $52_n$.

Figure 6:
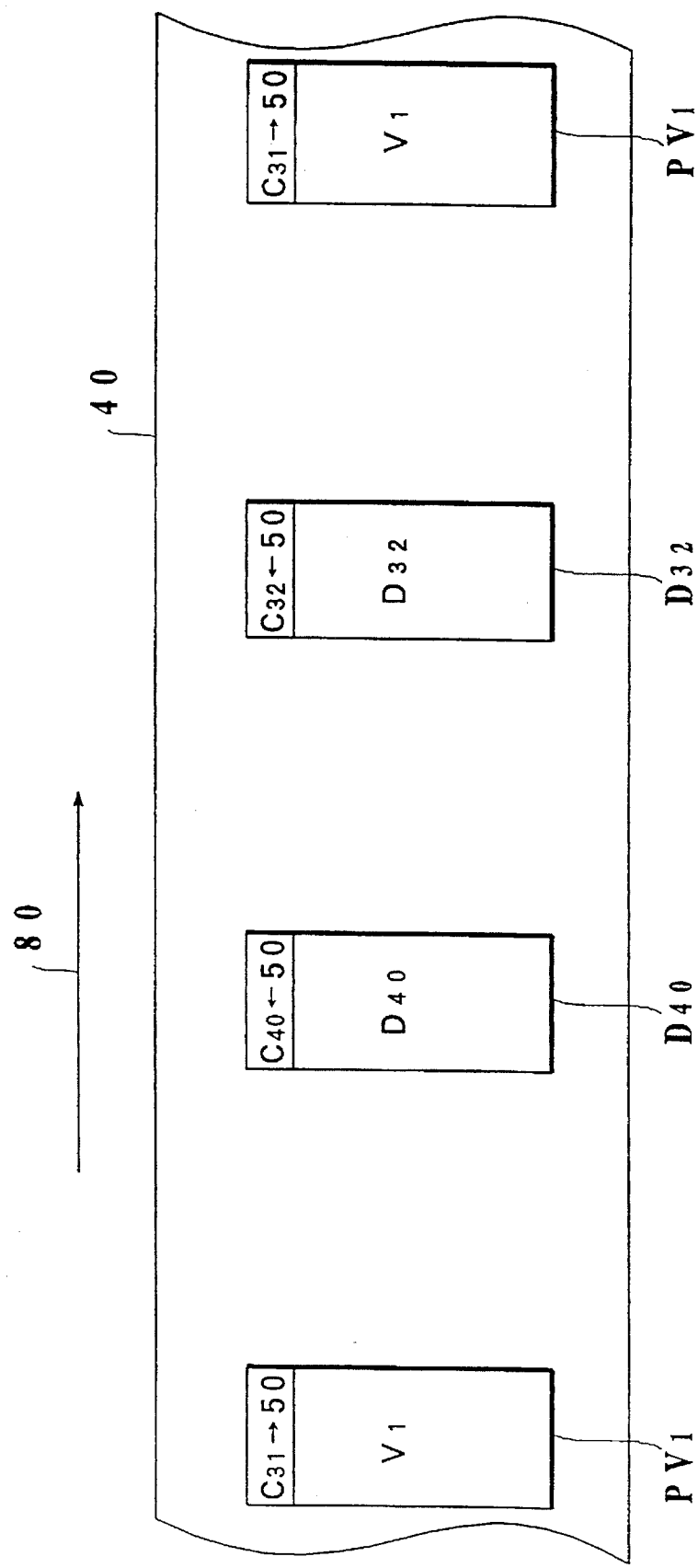
FIG. 6 is an illustration of packet data being communicated on the bus-line 40.

The status of the transmission of packetized data on the communication bus-line 40 is shown in FIG. 6. In this figure, the passage of time is shown by an arrow 80. First, the packetized image data $PV_1$ is sent from camera 31 to the central monitoring device 50. Next is shown the packetized data reflecting a request command $D_{40}$ from the central monitoring device 50 to the camera C40, and a request command $D_{32}$ to the camera C32. Next, packetized image data $PV_1$ from camera C31 is transmitted in a time multiplexed manner. Transmission of request commands and transmission of packetized image data are almost simultaneously carried out between the central monitoring device 50 and the monitoring cameras C31 to C40, by way of high speed multiplexed transmission. For example, in the central monitoring device 50, the request command $D_{40}$ seemingly can be transmitted to the camera C40 simultaneously with the reception of packetized image data $PV_{31}$ from the camera C31. In other words, substantially full duplex transmission between the central monitoring device 50 and a number of monitoring cameras can be carried out on the communication bus-line 40.

Figure 7:
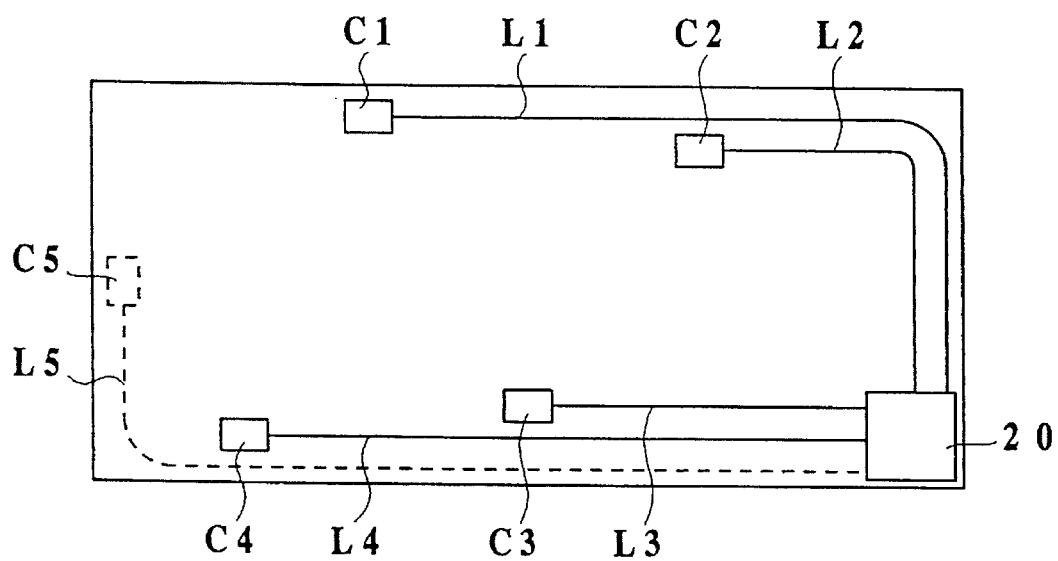
FIG. 7 is a block diagram of the wiring of a prior art communication system.
Figure 8:
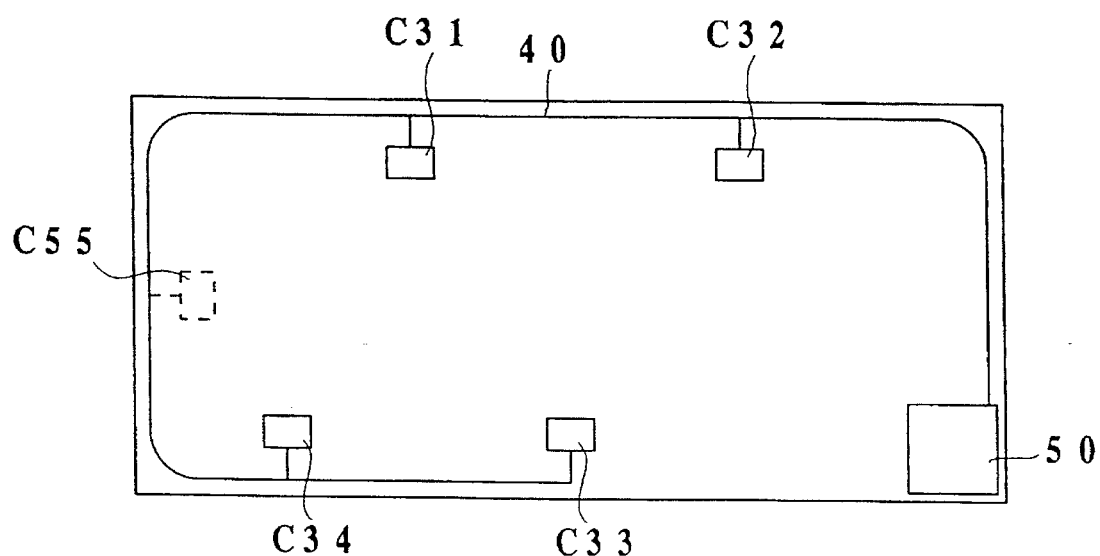
FIG. 8 is a block diagram of the wiring of a communication system according to the present invention.

Referring now to FIG. 8, therein is shown a block diagram of the wiring of a communication bus-line where the monitoring cameras C31 to C40 are provided at the same locations as the prior art system shown in FIG. 7. As can clearly be seen in this figure, only the communication bus-line 40 is required so that the structure becomes very simple. Even in the situation where an additional monitoring camera C55 is added, only the wiring to the communication bus-line 40 and addition of the data concerning the camera C55 into the table of FIG. 4 are required.

As described above, in this image communication system, adding or changing the structure of the system is easily carried out.

Although in this embodiment the request commands and the packetized image data are transmitted using pulse code modulation (PCM), in alternative embodiments the image data may be transmitted after it is first compressed (ADPCM etc.).

Although in this embodiment only one central monitoring device 50 is provided, in alternative embodiments, a number of central monitoring devices may be provided. In this case, each central monitoring device determines whether or not the packetized image data is directed to it.

Although the invention has been described in its preferred form with a certain degree of particularity, it is understood that the present disclosure of the preferred form may be changed in the details of its construction and any combination and arrangement of the parts thereof may be modified without departing from the spirit and the scope of the invention as hereinafter claimed.

What is claimed is:

1. An image obtaining terminal for connection to a network bus-line, comprising:

video convening means for converting an image into a video signal;

analog to digital convening means for converting the video signal into digital image data;

memory means for storing the digital image data;

judging means for determining whether or not a request command on the network bus-line is addressed to a particular image obtaining terminal; and communication control means for transmitting the digital image data stored in the memory means over the network bus-line when the judging means determines that the request command is addressed to the particular image obtaining terminal, said communication control means including means for adding an identifier to said digital image data before said digital image data is transmitted, indicating that said digital image data is being transmitted from the particular image obtaining terminal.

2. An image obtaining terminal according to claim 1, wherein said video converting means includes a video camera.

3. A central monitoring device for connection to a network bus-line, comprising:

terminal selection means for selecting a particular image obtaining terminal from among a plurality of image obtaining terminals connected to said network bus-line;

transmission means for transmitting a request command over said network bus-line to said particular image obtaining terminal, said request command causing said particular image obtaining terminal to transmit image data and an identifier to said central monitoring device over said network bus-line, said transmission means also including means for adding an identifier before transmitting said request command, indicating that said request command is addressed to said particular image obtaining terminal;

digital to analog converting means for converting the image data from the particular image obtaining terminal into an analog video signal;

image reproducing means for reproducing an image corresponding to said video signal.

4. A central monitoring device according to claim 3, wherein said image reproducing means includes a cathode ray tube.

5. A central monitoring device according to claim 3, wherein said image reproducing means includes a liquid crystal display.

6. A bus-line network communication system comprising:

a plurality of image obtaining terminals, wherein each image obtaining terminal comprises video convening means for converting an image into a video signal;

analog to digital converting means for converting the video signal into digital image data;

memory means for storing the digital image data;

judging means for determining whether or not a request command on the network bus-line is addressed to a particular image obtaining terminal; and communication control means for transmitting the digital image data stored in the memory means over the network bus-line when the judging means determines that the request command is addressed to the particular image obtaining terminal, said communication control means including means for adding an identifier to said digital image data before said digital image data is transmitted, indicating that said digital image data is being transmitted from the particular image obtaining terminal;

a central monitoring device comprising terminal selection means for selecting a particular image obtaining terminal from among a plurality of image obtaining terminals connected to said network bus-line;

transmission means for transmitting a request command over said network bus-line to said particular image obtaining terminal, said request command causing said particular image obtaining terminal to transmit image data to said central monitoring device over said network bus-line, said transmission means also including means for adding an identifier before transmitting said request command, indicating that said request command is addressed to said particular image obtaining terminal;

digital to analog converting means for converting the image data from the particular image obtaining terminal into an analog video signal;

image reproducing means for reproducing an image corresponding to said video signal; and a single network bus-line connected between said plurality of image obtaining terminals and said central monitoring device.

7. A bus-line network communication system according to claim 6 further comprising a plurality of central monitoring devices connected to said network bus-line.

8. A method for communicating data between a central monitoring device and a plurality of image obtaining terminals over a bus-line network, comprising the steps of:

transmitting over said network bus-line a request command from said central monitoring device to a particular image obtaining terminal selected from among the plurality of image obtaining terminals;

determining in each of said plurality of image obtaining terminals whether or not the request command from the central monitoring device is addressed to the particular image obtaining terminal;

transmitting image data over the network bus-line from the particular image obtaining terminal addressed by said request command;

adding an identifier indicating that the image data is being transmitted from the particular image obtaining terminal; and reproducing at said central monitoring device an image corresponding to the image data transmitted over the network bus-line.

* * * * *